United States Patent
Jabori et al.

(10) Patent No.: US 10,437,290 B2
(45) Date of Patent: Oct. 8, 2019

(54) ACCESSORY DEVICE FOR A COMPUTING DEVICE

(71) Applicant: HEWLETT-PACKARD DEVELOPMENT COMPANY, L.P., Houston, TX (US)

(72) Inventors: Monji G Jabori, Houston, TX (US); Robert E Krancher, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/746,102

(22) PCT Filed: Aug. 14, 2015

(86) PCT No.: PCT/US2015/045322
§ 371 (c)(1),
(2) Date: Jan. 19, 2018

(87) PCT Pub. No.: WO2017/030536
PCT Pub. Date: Feb. 23, 2017

(65) Prior Publication Data
US 2018/0210509 A1    Jul. 26, 2018

(51) Int. Cl.
*G06F 3/0346* (2013.01)
*G06F 1/16* (2006.01)

(52) U.S. Cl.
CPC .......... *G06F 1/1677* (2013.01); *G06F 1/1616* (2013.01); *G06F 3/0346* (2013.01)

(58) Field of Classification Search
CPC ..... G06F 1/1677; G06F 1/1616; G06F 3/0346
See application file for complete search history.

(56) References Cited

U.S. PATENT DOCUMENTS

| | | | |
|---|---|---|---|
| 8,599,542 B1 | 12/2013 | Healey et al. | |
| 2004/0119684 A1* | 6/2004 | Back | G06F 1/1626 345/156 |
| 2005/0289274 A1* | 12/2005 | Ghercioiu | G06F 1/183 710/303 |
| 2009/0143877 A1* | 6/2009 | Panje | G06F 1/1626 700/83 |
| 2012/0140396 A1 | 6/2012 | Zeliff et al. | |
| 2013/0076614 A1 | 3/2013 | Ive et al. | |
| 2013/0228435 A1* | 9/2013 | Whitt, III | H01H 13/704 200/5 A |

(Continued)

FOREIGN PATENT DOCUMENTS

TW      201418948 A    5/2014

*Primary Examiner* — Stephen G Sherman
(74) *Attorney, Agent, or Firm* — HPI Patent Department

(57) ABSTRACT

Examples disclosed herein provide an accessory device for a computing device. The accessory device can include a first section, a second section, and a third section. The first section can include one or more input devices. The second section can be pivotally connected to the first section at a first end of the second section. The third section can be pivotally connected to the second section at a second end of the second section. The protective cover can include a connector to electrically couple the input devices with the computing device when the connector is to connect with a port of the device. Motion sensors disposed within the accessory device can be used to determine an angle of the computing device with respect to the accessory device.

14 Claims, 3 Drawing Sheets

(56) References Cited

U.S. PATENT DOCUMENTS

2013/0231755 A1 9/2013 Perek et al.
2015/0154737 A1 6/2015 McRae
2016/0063338 A1* 3/2016 Osborne ................ G06K 9/209
                                                                               358/452

* cited by examiner

ACCESSORY DEVICE FOR A COMPUTING DEVICE

BACKGROUND

The emergence and popularity of mobile computing has made portable computing devices, due to their compact design and light weight, a staple in today's marketplace. Tablet computers are examples of portable computing devices that are widely used. Tablet computers generally employ a touchscreen on a display surface of the device that may be used for both viewing and input. Users of such devices may interact with the touchscreen via finger or stylus gestures. As an example, an on-screen keyboard may be illustrated on the touchscreen surface for entering characters.

DETAILED DESCRIPTION

As the computing power of portable computing devices, such as tablet computers, continue to increase, users may desire to expand the use of such devices, for example, from solely employing the touchscreen on the display surface of such devices for both viewing and input. As an example, various peripherals may be used to expand the use of the portable computing device. Such devices that combine tablet computers with optional peripherals are also known as 2-in-1 devices. An example of such peripherals include, but is not limited to, a keyboard. With regards to a keyboard, there may be instances when users may desire to enter characters via an external, physical keyboard, particularly when creating content or typing for a prolonged period of time (e.g., creating a document, spreadsheet, or slides).

Examples disclosed herein provide an accessory device for computing devices, such as tablet computers. The accessory device includes peripherals, such as a physical keyboard, and may also function as a protective cover to protect at least the display surface of the devices when not in use. As will be further described, the accessory device includes motion sensors, such as accelerometers, that may be used to determine the angle of a computing device attached to the accessory device, in order to control functions of the accessory device or the computing device based on the angle. For example, the accessory device may be disabled at certain angles, in order to prevent any inadvertent input. In addition, the display screen of the computing device may be disabled at certain angles, in order to conserve power and extend battery life.

Figure 1:
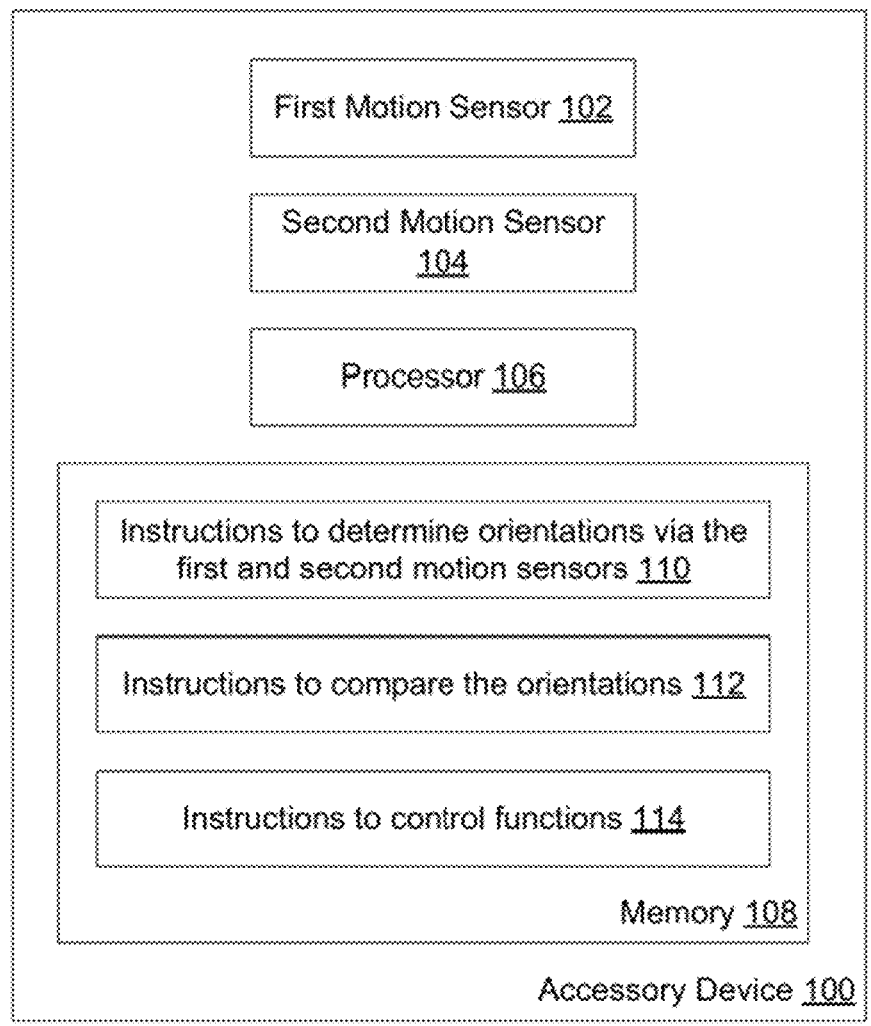
FIG. 1 is a block diagram illustrating an accessory device that is attachable to a computing device, according to an example.

With reference to the figures, FIG. 1 is a block diagram illustrating an accessory device 100 that is attachable to a computing device, such as a tablet computer, according to an example. The accessory device 100 includes one or more input devices or peripherals for expanding the use of the computing device, such as a keyboard. As illustrated, the accessory device 100 includes at least a first and second motion sensor 102, 104. As will be further described, the first motion sensor 102 may be disposed in a first portion of the accessory device 100, and the second motion sensor 104 may be disposed in a third portion of the accessory device 100 that is separated from the first portion via a second portion that includes a foldable region.

As an example, the first portion of the accessory device 100 may correspond to the area of the accessory device 100 that includes the input devices or peripherals, such as the keyboard. The third portion of the accessory device 100 may correspond to a rigid portion that attaches, for example, to a bottom of the computing device. As a result, the first motion sensor 102 may measure the orientation of the keyboard, and the second motion sensor 104 may measure the orientation of the computing device, as the computing device is attached to the third portion of the accessory device 100. Upon comparing these orientations, the angle of the computing device with respect to the accessory device 100 may be determined. As mentioned above, this angle may be used to control functions of the accessory device 100 or computing device.

The accessory device 100 also includes a controller or processor 106 and a memory device 108. The components of the accessory device 100 may be connected and communicate through a system bus (e.g., PCI, ISA, PCI-Express, HyperTransport®, NuBus, etc.). The processor 106 can be a single core processor, a multi-core processor, a computing cluster, or any number of other configurations. The processor 106 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 108 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems comprising (e.g., encoded with) instructions 110, 112, and 114. In some examples, the memory device 108 may include additional instructions. As an example, memory device 108 may be a non-transitory machine-readable storage medium. The processor 106 may fetch, decode, and execute instructions stored on the memory device 108 to implement the functionalities described below. As an example, the operations or instructions may be executed at least by the first and second motion sensors 102, 104.

As an example, the motion sensors 102, 104 may operate in polling mode or interrupt mode. In polling mode, the processor 106 may poll the motion sensors 102, 104, for example, at fixed time intervals, in order to obtain measurements. However, if there are power management benefits, the motion sensors 102, 104 may rather be operated in interrupt mode, where either sensor 102, 104 may trigger the processor 106 to read a measurement, for example, when either sensor 102, 104 reads a change in measurement above a threshold amount. As a result, the process 106 may remain in sleep mode until a measurement above the threshold amount is read by either motion sensor 102, 104, thereby providing power management benefits.

Figure 2A:
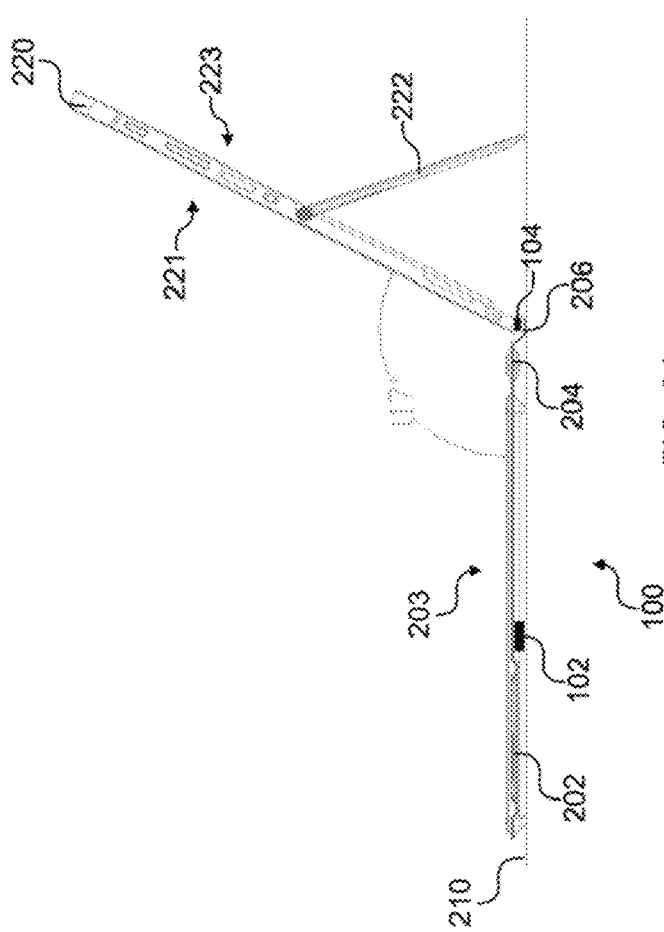
FIGS. 2A-C illustrate various angles that the accessory device makes with the computing device attached the accessory device, according to an example.
Figure 2B:
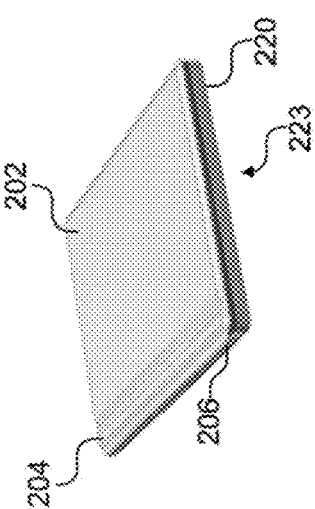
Figure 2C:
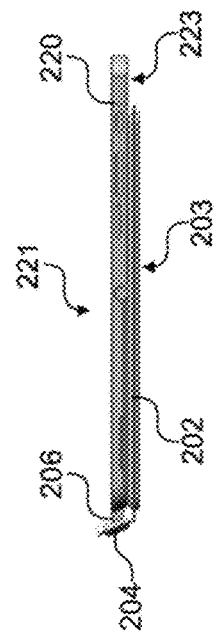

FIGS. 2A-C illustrate various angles that the accessory device 100 makes with a computing device 220 attached the accessory device 100, according to an example. The computing device 220 may include a display surface 221 (e.g., a touchscreen that may be used for both viewing and input) and a back surface 223 opposite the display surface 221. As an example, the system, including the accessory device 100 and the computing device 220, may be supported on a surface 210 (e.g., a user's lap or a horizontal surface) by a kickstand 222 disposed on the back surface 223 of the computing device 220. The kickstand 222 may be attached to the back surface 223 by a torqued hinge, allowing for the display surface 221 of the computing device 220 to be viewed at various viewing angles (e.g., according to the placement of the kickstand 222 on the horizontal surface 210).

The accessory device 100 includes at least a first section 202, a second section 204, and a third section 206. The first section 202 may be composed of a rigid or semi-rigid material in order to provide a level of sturdiness and rigidity while using the accessory device 100 with the computing device 220. Examples of materials that may be used for the first section 202 include, but are not limited to, plastics, fiber glass, carbon fiber composites, and metals. The first section 202 may include one or more input devices or peripherals for expanding the use of the portable computing device. As an example, the first section 202 of the accessory device 100 may include a keyboard 203.

The first section 202 may be pivotally connected to the second section 204 at a first end of the second section 204, as illustrated in FIG. 2A. The second section 204 may be composed of foldable or pliable material, allowing for the second section 204 to be folded. The second section 204 may be pivotally connected to the third section 206 at a second end of the second section 204. As an example, the accessory device 100 may include a connector on the third section 206 for electrically coupling the input devices of the accessory device 100 (e.g., keyboard 203) with the computing device 220. As an example, the input devices may be electrically coupled with the computing device 220 when the connector is connected with a port of the computing device 220.

As an example, in order to determine the angle of the computing device 220 with respect to the accessory device 100, orientations of the computing device 220 and the accessory device 100 may be determined first. As illustrated, the accessory device 100 may include the first motion sensor 102 disposed within the first section 202 of the accessory device 100, and the second motion sensor 104 disposed within the third section 206 of the accessory device 100. As a result, the first motion sensor 102 may measure the orientation of the first section 202 (e.g., the keyboard 203), and the second motion sensor 104 may measure the orientation of the computing device 220, as the computing device 220 is attached to the third section 206 of the accessory device 100. Upon comparing these orientations, the angle of the computing device 220 with respect to the accessory device 100 may be determined. As mentioned above, this angle may be used to control functions of the accessory device 100 or computing device 220.

As an example, the motion sensor 102, 104 for detecting the orientations of the accessory device 100 and the computing device 220, respectively, may include accelerometers for detecting orientations with respect to a reference plane (e.g., the horizontal surface 210 or gravity). As an example, both accelerometers may be calibrated, for example, in a flat keyboard position on the horizontal surface 210, with the accessory device 100 closed on the display surface 221 of the computing device (e.g., see FIG. 2B). The angle delta between the accessory device 100 and the computing device 220 may be 0 degrees in the orientation illustrated in FIG. 2B. After calibration, the accelerometers (e.g., motion sensors 102, 104) may measure the orientations of the accessory device 100 and the computing device 220 with respect to a reference plane, such as a flat surface of the accessory device (e.g., keyboard 203). These orientations may be compared against each other in order to determine the angle of the computing device 220 with respect to the accessory device 100. Examples of other motion sensors that may be used include, but are not limited to, a compass and a gyroscope, that may be used alone or in combination.

Referring to FIG. 2A, upon determining the orientations of the accessory device 100 and the computing device 220 with respect to the keyboard 203, the angle of the computing device 220 with respect to the accessory device 100 may be 117 degrees. At this angle, it may be desirable to view content from the display surface 221 and to utilize the functionality of the accessory device 100. As a result, the keyboard 203 and/or trackpad (not illustrated) on the accessory device, as well as the display surface 221 may be enabled. As the kickstand 222 may allow for the display surface 221 to be viewed at various viewing angles, the display surface 221 and functionality of the accessory device 100 may be enabled when the angle between the computing device 220 and the accessory device 100 is between a certain range. As an example, when the angle of the computing device 220 with respect to the accessory device is between 45 degrees and 180, the display surface 221 and functionality of the accessory device 100 may be enabled. Outside this range, the display surface 221 or functionality of the accessory device 100 may be disabled, as will be further described.

Referring to FIG. 2B, the accessory device 100 may function as a protective cover, with the first section 202 of the accessory 100 protecting the display surface 221 of the computing device 220 (e.g., when the computing device 220 is not in use). As an example, the second section 204 may wrap around to the display surface 221. As described above, the second section 204 may be composed of foldable or pliable material, allowing for the second section 204 to be folded. As an example, the motion sensors 102, 104 may determine the angle of the computing device 220 with respect to the accessory device 100 to be 0 degrees, as illustrated. At this angle, as the computing device 220 is likely not in use, the display surface 221 and the functionality of the accessory device 100 may be disabled. In addition to the example illustrated in FIG. 2B, the devices 100, 220 may also be disabled when the angle is between a certain range (e.g., between 0 degrees and 45 degrees).

Referring to FIG. 2C, the accessory device 100 may be rotated all the way to the back surface 223 of the computing device 220, where the keyboard 203 is now disposed along a bottom surface of the accessory device 100. In this example, there is a possibility for inadvertent input on the keyboard 203, particularly as a user is likely using the display surface 221 as input instead of any functionality from the accessory device 100. Therefore, it is desirable for functionality from the accessory device 100, such as the keyboard to be disabled. In this example, the motion sensors 102, 104 may determine the angle of the computing device 220 with respect to the accessory device to be 360 degrees. In addition to the example illustrated, the functionality of the keyboard may also be disabled with the angle between the computing device 220 and the accessory device 100 is between a certain range (e.g., between 180 degrees and 360 degrees).

Figure 3:
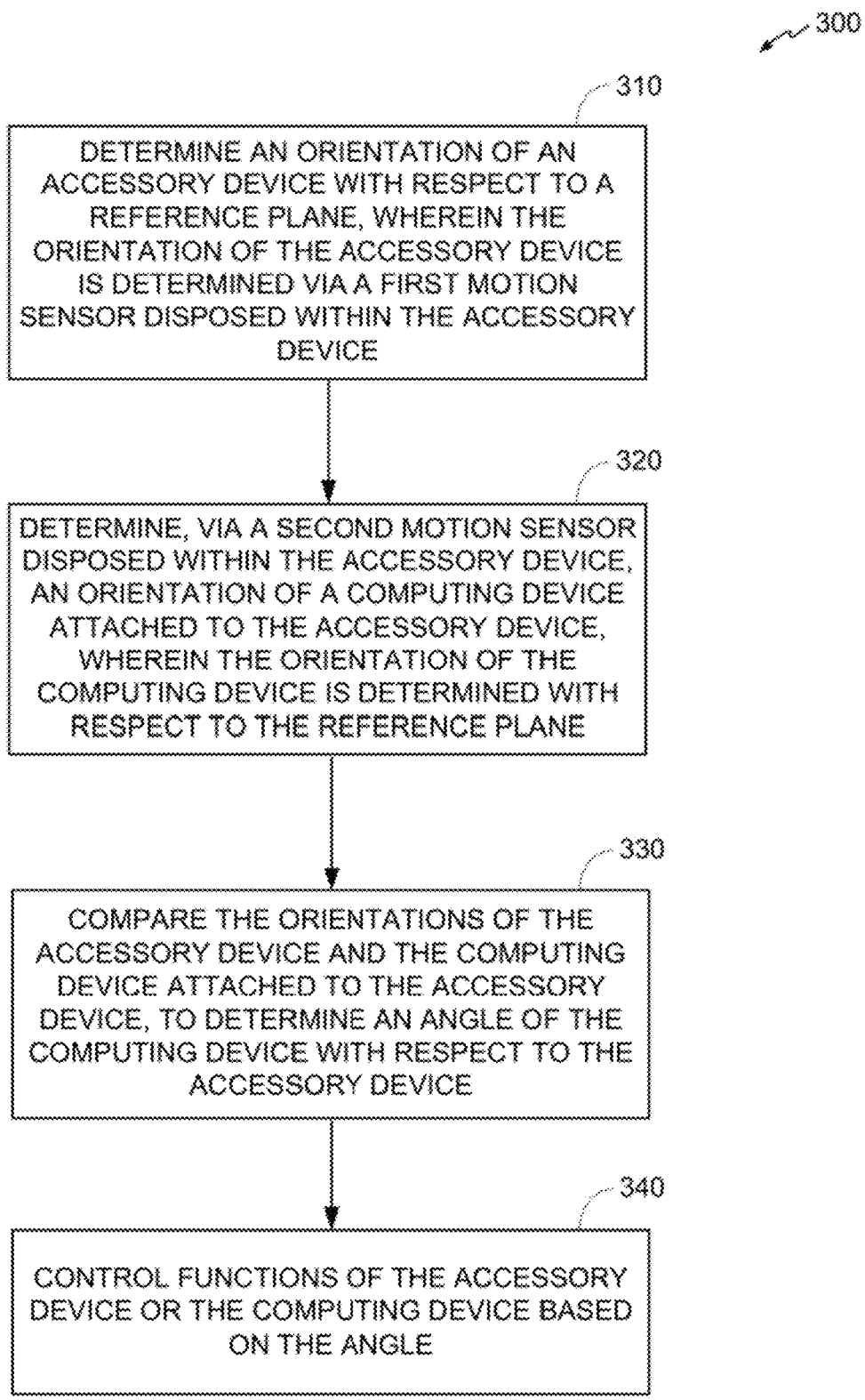
FIG. 3 is a flow diagram in accordance with an example of the present disclosure.

Referring to FIG. 3, a flow diagram is illustrated in accordance with various examples. The flow diagram illustrates, in a particular order, processes for determining the angle of a computing device with respect to an accessory device. The order of the processes is not meant to limit the disclosure. Rather, it is expressly intended that one or more of the processes may occur in other orders or simultaneously. The disclosure is not to be limited to a particular example.

A method 300 may begin and progress to 310, where an accessory device may determine an orientation of the accessory device with respect to a reference plane. As an example, the orientation of the accessory device is determined via a first motion sensor disposed within the accessory device. As an example, the reference plane is a flat surface of the accessory device.

Progressing to 320, the accessory device may determine, via a second motion sensor disposed within the accessory device, an orientation of the computing device attached to the accessory device. As an example, the first and second motion sensors are separated by a foldable region of the accessory device. As an example, the orientation of the computing device is also determined with respect to the reference plane. As an example, the first and second motion sensors are polled at fixed time intervals, in order to determine the orientations of the accessory device and the computing device, respectively. However, the accessory device may also receive an interrupt signal from either the first or second motion sensor in order to determine the orientation of the accessory device or the computing device, respectively. As an example, the first and second motion sensors include accelerometers.

Progressing to 330, the accessory device may compare the orientations of the accessory device and the computing device attached to the accessory device, in order to determine an angle of the computing device with respect to the accessory device. Progressing to 340, the accessory device may control functions of the accessory device or the computing device based on the angle. As an example, the accessory device may be enabled or disabled, based on the angle of the computing device with respect to the accessory device. As an example, a display screen of the computing device may also be enabled or disabled, based on the angle. The accessory device and computing device may be enabled or disabled together or independently, based on the angle.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
   determining an orientation of an accessory device with respect to a reference plane, wherein the orientation of the accessory device is determined via a first motion sensor disposed within the accessory device;
   determining, via a second motion sensor disposed within the accessory device, an orientation of a computing device attached to the accessory device,
   wherein the first and second motion sensors are separated by a foldable region of the accessory device, and
   wherein the orientation of the computing device is determined with respect to the reference plane;
   comparing the orientations of the accessory device and the computing device attached to the accessory device, to determine an angle of the computing device with respect to the accessory device; and
   controlling functions of the accessory device or the computing device based on the angle.

2. The method of claim 1, wherein controlling the functions of the accessory device comprises enabling or disabling the accessory device based on the angle of the computing device with respect to the accessory device.

3. The method of claim 1, wherein controlling the functions of the computing device comprises enabling or disabling a display screen of the computing device based on the angle of the computing device with respect to the accessory device.

4. The method of claim 1, wherein the first and second motion sensors are polled at fixed time intervals in order to determine the orientations of the accessory device and the computing device, respectively.

5. The method of claim 1, comprising receiving an interrupt signal from either the first or second motion sensor in order to determine the orientation of the accessory device or the computing device, respectively.

6. The method of claim 1, wherein the reference plane is a flat surface of the accessory device.

7. The method of claim 1, wherein the first and second motion sensors comprise accelerometers.

8. An accessory device comprising:
   a first portion comprising a first accelerometer disposed within the first portion;
   a second portion that is separated from the first portion via a foldable region, wherein the second portion comprises a second accelerometer disposed within the second portion;
   a memory resource; and
   a processing resource, wherein a plurality of programming instructions stored in the memory resource, in response to execution of the programming instructions by the processing resource, is to cause the processing resource to:
     determine, via the first accelerometer, an orientation of the first portion with respect to a reference plane;
     determine, via the second accelerometer, an orientation of a computing device attached to the second portion, wherein the orientation of the computing device is determined with respect to the reference plane;
     compare the orientations of the first portion and the computing device attached to the second portion, to determine an angle of the computing device with respect to the accessory device; and
     control functions of the accessory device or the computing device based on the angle.

9. The accessory device of claim 8, wherein the processing resource is to poll the first and second accelerometers at fixed time intervals in order to determine the orientations of the accessory device and the computing device, respectively.

10. The accessory device of claim 8, wherein the processing resource is to receive an interrupt signal from either the first or second accelerometer in order to determine the orientation of the accessory device or the computing device, respectively.

11. The accessory device of claim 8, wherein the reference plane is a flat surface of the accessory device.

12. A system, comprising:
   a computing device including a display surface and a back surface opposite the display surface; and
   an accessory device for the computing device, comprising:
      a first section including one or more input devices;
      a second section pivotally connected to the first section at a first end of the second section;
      a third section pivotally connected to the second section at a second end of the second section;
      a connector on the third section to electrically couple the input devices with the computing device when the connector is to connect with a port of the device;
      a first motion sensor disposed within the first section, wherein the first motion sensor is to determine an orientation of the first section with respect to a reference plane; and
      a second motion sensor disposed within the third section, wherein the second motion sensor is to determine an orientation of the computing device attached to the third section via the connector, wherein the orientation of the computing device is determined with respect to the reference plane.

13. The system of claim 12, wherein a comparison of the orientations of the first section and the computing device with respect to the reference plane provides an angle of the computing device with respect to the accessory device.

14. The system of claim 13, wherein functionality of the computing device or accessory device is altered according to the angle.

* * * * *